Dec. 7, 1948.                     K. P. BILLNER                     2,455,650
                              HANDLING APPARATUS
Filed March 10, 1947                                          3 Sheets-Sheet 1
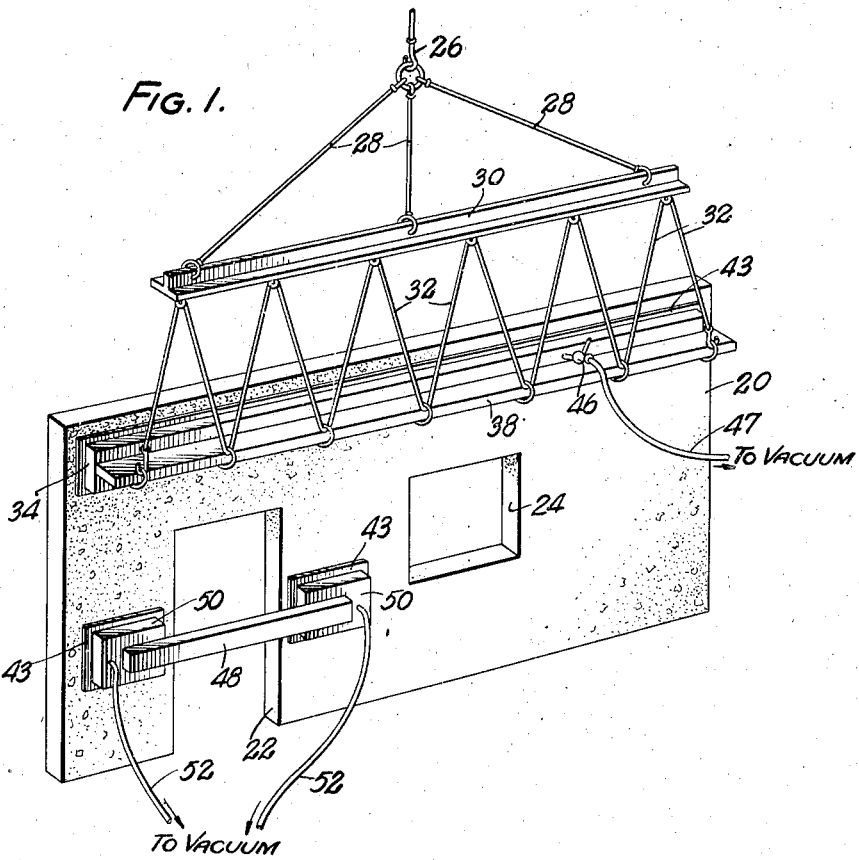
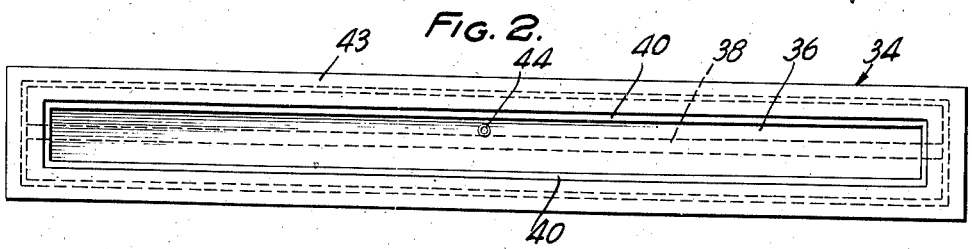
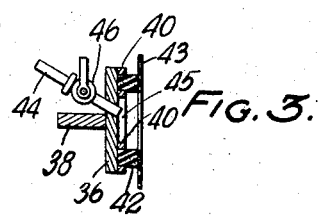
INVENTOR.
KARL P. BILLNER,
BY
Raymond Wholton
ATTORNEY Dec. 7, 1948.  K. P. BILLNER  2,455,650
HANDLING APPARATUS Filed March 10, 1947  3 Sheets-Sheet 2

INVENTOR.
KARL P. BILLNER,
BY
Raymond W Colton
ATTORNEY

Dec. 7, 1948.  K. P. BILLNER  2,455,650
HANDLING APPARATUS
Filed March 10, 1947  3 Sheets-Sheet 3
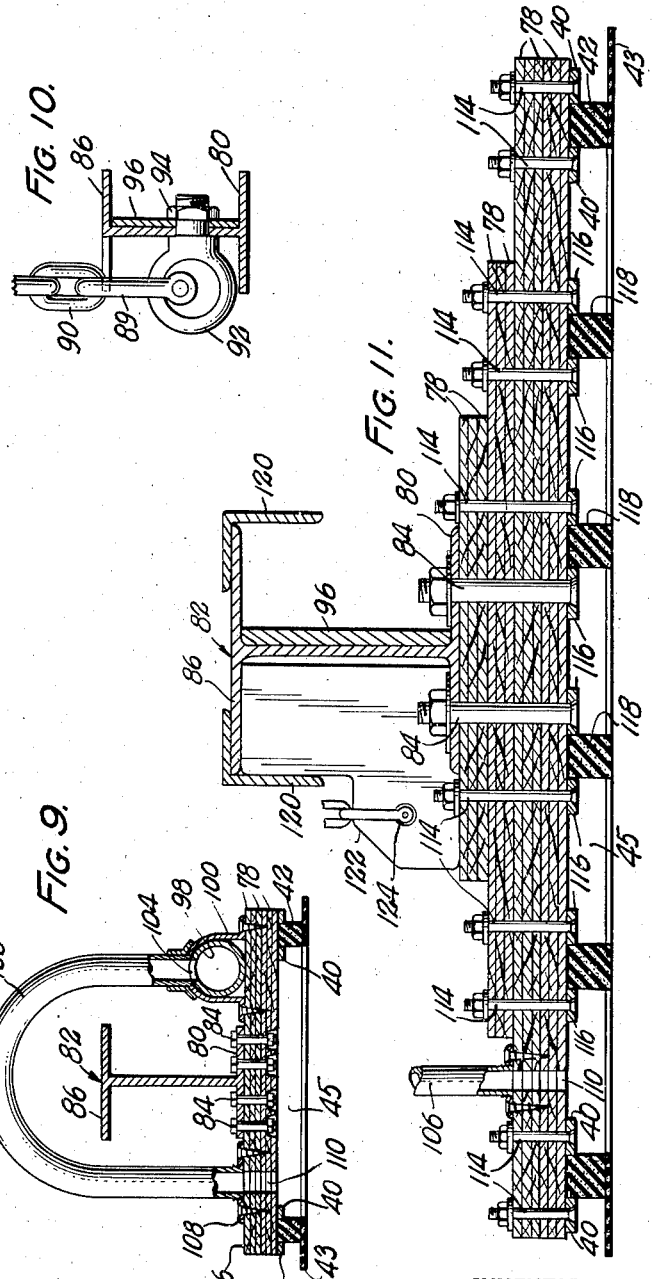
INVENTOR.
KARL P. BILLNER,
BY
Raymond W Coolton
ATTORNEY Patented Dec. 7, 1948

2,455,650

UNITED STATES PATENT OFFICE 2,455,650

HANDLING APPARATUS

Karl P. Billner, Philadelphia, Pa., assignor to Vacuum Concrete, Inc., a corporation of Pennsylvania Application March 10, 1947, Serial No. 733,639

12 Claims. (Cl. 294—65)

This invention relates to handling apparatus for use in reinforcing and lifting bodies of various types and is particularly well adapted to the handling of preformed concrete bodies.

The removal of preformed concrete bodies from their forms has constituted a problem which has been so serious in the past as to greatly retard the progress of prefabrication with concrete. Due to the lack of uniformity of adhesion between a concrete body and its form, most methods of separation, excepting actual destruction of the form, have been attended by unequal stresses and resultant breakage of the molded body. Methods of and apparatus for handling preformed concrete bodies during erection have likewise been inadequate in the past, resulting in non-uniform and excessive stresses and consequent failure of such bodies.

It has been found in accordance with the present invention that such construction elements as concrete walls, partitions, beams, roof members and others, even where their surface areas are extensive or discontinuous can be handled safely, economically and rapidly by the proper application of vacuum principles.

The use of vacuum for handling sheet glass has been proposed in the past, but the relatively smooth surfaces in the case of glass fail to present the same problems as are encountered with surfaces containing irregularities of the type presented by molded concrete. Moreover, in view of the relative weights involved, the prior art teachings in connection with glass handling are inapplicable to the handling of heavy concrete elements.

Accordingly, while the apparatus of the present invention can be employed in handling many types of objects and materials other than concrete, apparatus heretofore known is not satisfactory for the uses primarily contemplated herein.

This invention proposes a mat adapted for suspension from a hoist for handling a preformed concrete body, comprising a shell having an open side for application to a major dimension of a surface of such a concrete body, gasket means carried by the mat for effecting a seal between its open side and the surface of the concrete body, and means for evacuating the chamber thus formed by the mat and concrete surface. The gasket means being preferably yieldable and/or readily deformable, permits the mat and concrete body to move closer together under the effect of ambient pressure when the chamber between them has its pressure reduced, compressing the gasket means and imparting an increased resistance to shear thereto. At the same time, the plastic nature of the gasket means permits sufficient flow to compensate for such irregularities as may be present on the concrete surface. Because of such irregularities, it is desirable to provide means for establishing a preliminary seal between the mat and concrete surface, which may assume the form of a limp flap of material, preferably resilient, such as thin rubber sheeting, extending peripherally from the mat or gasket means for engagement with the surface of the body to be handled.

Lateral movement of the gasket means with respect to the shell must be restrained to permit the body being handled by the mat to be shifted in its own plane. This may be accomplished by the provision of suitable beads or grooves for fitting the gasket means to the shell. The gasket means will in all cases project sufficiently from the shell to permit the degree of deformation necessary to proper strength against shearing and at the same time prevent abutment of the rigid portions of the mat against the surface of the body.

The mat is frequently provided with intermediate yieldable supporting means within and susbtantially coplanar with the gasket means, to contact the surface of the body being handled. Such supporting means will be spaced with respect to the gasket means to limit external moments on the body to values less than the resisting moment of the body.

Reinforcing means in the form of a rib or stiffener may be provided for one or more surfaces of the mat to impart the degree of rigidity necessary to avoid undue stressing of the body being handled. A plurality of mats, contiguous or spaced, may be joined to a single backing or reinforcing member. The means for producing or controlling the pressure within the chamber defined between a mat and a body being handled may be located remotely from the mat or be mounted thereon or closely adjacent thereto.

It is also contemplated to provide load distributing means for interposition between the mat or mats and a hoist, to avoid such unequal stresses as would tend to damage the body to be handled. Such load distributing means may be connected to the mats through a suitable reinforcing means therefor.

A more complete understanding of the invention will follow from a description of the attached drawings wherein:

Fig. 1 is a somewhat diagrammatic perspective showing the use of a hoist for handling a reinforced concrete wall and temporary reinforcement at an opening in the wall;

Fig. 2 is a bottom plan view of a mat of the type depicted in Fig. 1;

Fig. 3 is a sectional elevation of the mat of Fig. 2;

Fig. 8 is a plan view of another form of mat;

Fig. 9 is a section taken along line 9—9 of Fig. 8;

Fig. 10 is a section taken along line 10—10 of Fig. 8; and

Fig. 11 is a sectional elevation of a further modification.

Figure 4:
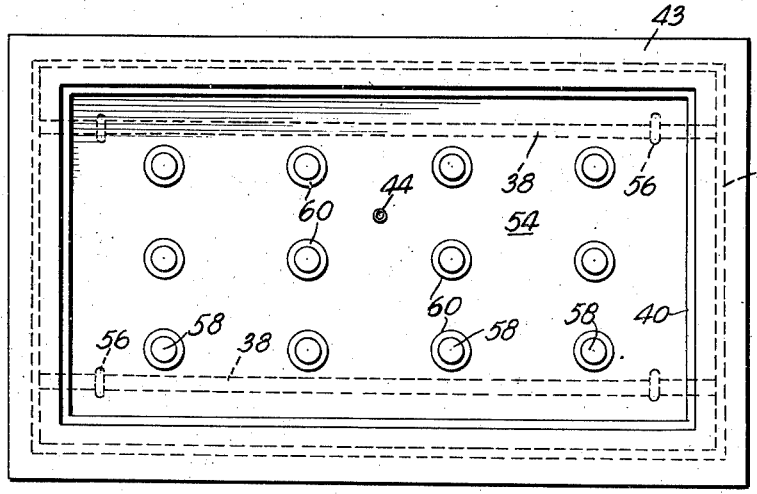
Fig. 4 is a bottom plan of a modified form of mat.

The prefabricated concrete wall 20 of Fig. 1 includes a door opening 22 and a window opening 24. The wall is depicted in a vertical position to which it has been elevated by a hoist whose hook 26 is connected through cables 28 to a spreader 30 which is in turn connected by cables 32, which may be self compensating as shown, to the mat 34. As indicated in Figs. 2 and 3, the mat comprises a frame 36, composed of plywood, sheet metal or other suitable material, the rear surface of which is reinforced by a rib or web 38 by which it is attached to a hoist by means of rings or perforations (not shown in these figures) suitably provided therefor. The other surface of the mat is provided with beads 40 secured thereto, spaced to receive and restrain against lateral movement, a peripheral, flexible and readily deformable sealing gasket 42, composed of sponge or other form of cellular rubber or the like, which defines with the frame a hollow shell having an open side for application to a surface of a body to be handled. Whereas the gasket under compression develops ample strength to resist shearing stresses even when the body is moved in its own plane, these beads will prevent slippage of the gasket relative to the mat. To insure a preliminary and rapid seal between the mat and the surface to which it is applied, despite the presence of irregularities which might be encountered, a peripheral flap 43 of resilient material differing in its properties from that constituting the gasket and characterized by its limp condition is adhesively or otherwise applied to the lower surface of the gasket 42, so that immediately upon the reduction of pressure within the chamber 45 defined between the mat and the body to be handled, the flap will readily conform to the surface of the body and permit the desired degree of evacuation of the chamber with a minimum amount of initial leakage. The composition of the flap may vary, but thin sheet rubber or rubber-like materials, such as dam rubber, have produced highly satisfactory results. A nipple 44 containing a valve 46 provides means for connecting the interior of the mat with a source of sub-ambient pressure through a suitable hose 47.

The reinforcing beam 48 bridging the door opening 22 of Fig. 1 is provided with a mat 50 at either end, similar to the mat 34 of Fig. 2. By connecting the tubes 52 leading from the chambers defined by these mats with the wall surface to a source of sub-ambient pressure, the mats 50 under the effect of ambient pressure, will establish a firm bearing upon the wall surfaces so as to become practically unitary therewith and the beam 48 will serve to strengthen the entire structure during handling.

Figure 5:
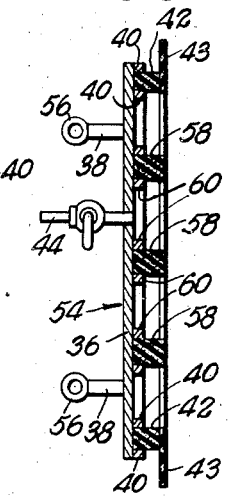
Fig. 5 is a sectional elevation of the mat of Fig. 4.

The mat 54 of Figs. 4 and 5 is somewhat similar to that of Fig. 2, having a gasket 42 held between beads 40, a pair of reinforcing ribs 38 provided with suspending rings 56 and a valved nipple 44 for connection with a source of sub-ambient pressure. Here again, a peripheral flap 43 of resilient, airtight, limp material is provided, applied to the surface of the material constituting the gasket 42, for effecting a preliminary seal between the mat and the surface of the body to be handled. Since the mat of Fig. 4 is designed to cover a larger area than that illustrated in Fig. 2, intermediate supports 58 have been provided in the form of readily deformable flexible elements such as rubber of the type employed for the gasket 42 to prevent collapse of the mat when it is subjected to the differential pressures encountered in its use, and to limit the external moments applied to the body to a value less than its resisting moment. These intermediate supports are preferably substantially coplanar with the gasket 42 or flap 43, and are shown in this modification as being of a disk or button type, retained in position by annular beads 60 secured to the front face of the frame.

Figure 6:
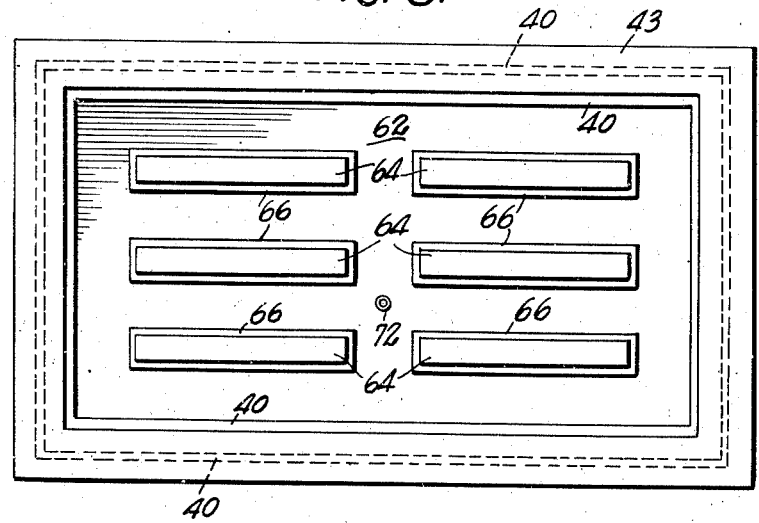
Fig. 6 is a bottom plan of another form of mat.
Figure 7:
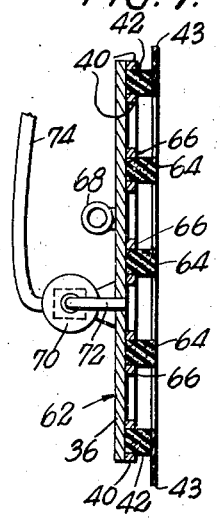
Fig. 7 is a sectional elevation of the mat of Fig. 6.

A mat 62 is depicted in Figs. 6 and 7, especially adapted for submarine use, but applicable to other uses as well. As in the previously described examples, a frame 36 receives a marginal flexible gasket 42 of readily deformable material retained against lateral movement by grooves or beads 40, thus presenting a hollow shell or body having an open side for application to the surface of a body to be handled. A peripheral flap 43 of limp, resilient, thin rubber or rubber-like material is provided as before and for a similar purpose. Elongated intermediate supports 64, depicted as rectangular in this case, retained against lateral movement by beads 66, serve a purpose similar to the supports 58 of disk shape shown in Fig. 4. As before, the intermediate supports are similar in composition to the gasket 42 and substantially coplanar therewith or with the flap 43. No reinforcing ribs have been shown in this modification, attachment to a hoist being accomplished through a suitable number of rings 68 mounted on the rear surface of the mat. A suitably driven pump 70 is also carried on the rear surface of the mat for producing a sub-ambient pressure between the front surface of the mat and the surface of a body to be lifted or otherwise handled. The pump is connected with the interior of the mat by a tube 72, and may discharge through a tube 74.

The construction shown in Figs. 8, 9 and 10 includes a mat 76 formed from a plurality of laminations of plywood 78, secured together and to the lower flange 80 of an I-beam 82 by means of bolts 84. The upper flange 86 of the I-beam is recessed at suitably located points to define pockets 88 which provide freedom of pivotal movement for a clevis 89, suspended from a cable or chain 90, with respect to an eye-bolt 92 secured to the web of the I-beam at each of these points by means of a nut 94 bearing against a web reinforcing plate 96.

A manifold 98 is secured to the top surface of the mat by means of clips 100, the open end 102 of the manifold being connected to a source of sub-ambient pressure, not shown. At suitable intervals, the manifold is provided with radial ports 104 in communication with flexible tubes 106 whose opposite ends are secured by flanges 108 to the mat for communication through a port 110 penetrating the several plies 78 with the internal chamber 45 defined by the mat and the surface to which it is applied.

As in the preceding examples, the lower surface of the mat is provided with a marginal gasket 42 of flexible, readily deformable material such as cellular or sponge rubber, restrained against lateral movement by metal beads 40 secured to the mat by screws or the like, the gasket being faced with a thin limp flap 43 of rubber or rubber-like material which will conform to an irregular surface and effect a preliminary seal when the chamber 45 first has its pressure reduced through the manifold 98. As the mat is drawn down towards the surface of the body to be handled as result of further evacuation of the chamber, the gasket 42 will be deformed and compressed until its resistance to shear will be sufficient to sustain the load of the body being handled even when the body is being lifted vertically in its own plane. The I-beam 82 is shown in Fig. 8 as being reinforced at spaced points by means of stiffener members 112 depicted in broken lines.

The plywood layers 78 of Fig. 11 are in stepped relationship, the greatest thickness occurring centrally where the maximum stresses are encountered, the central portion being assembled to the lower flange 80 of an I-beam 82 by bolts 84 as in the construction of the preceding example. Additional bolts 114 are employed at intervals displaced from the central portion for securing the various plies together, and at the same time fastening the beads 40 and 116 to the mat for restraining the gasket 42 and intermediate supports 118 respectively against lateral movement as in certain of the modifications previously described. The gasket and intermediate supports are of similar flexible, readily deformable cellular rubber material and substantially coplanar so as to distribute the moments and retain their values below the resisting moment of the mat and of the body to be handled.

The web of the I-beam is reinforced by a plate 96 and its upper flange 86 by depending angles 120, one of which assists in retaining one or more lifting plates 122 having a perforation 124 to receive a hook or cable for suspension from a hoist.

It will be noted that the mat and its load can be swung through at least ninety degrees in each of the forms shown, so that a molded slab can be removed readily from a horizontal position such as it might assume in its form and elevated to a vertical position such as it might receive in use as a wall or partition.

Whereas several modifications of the invention have been illustrated and described, including the subject matter of application Serial No. 553,239, filed September 8, 1944, of which this application is considered to be a continuation in part, many additional forms have been designed and even others will suggest themselves to those skilled in the art. Accordingly, the invention should not be limited to these examples beyond the scope of the appended claims.

I claim:

1. A mat comprising a substantially rigid frame having laminations in stepped relationship to provide portions of varying strength, deformable self supporting sealing means defining an open chamber at one surface of said frame, said sealing means projecting beyond rigid portions of said frame under all conditions of operation, means restraining said sealing means against lateral movement, means securing said restraining means to said frame and securing certain of said laminations together, and means communicating with said chamber for exhausting the same.

2. A mat adapted for handling a preformed concrete body of substantial size comprising a substantially rigid frame having a compressible cellular resilient gasket secured to one surface thereof defining an open chamber, said gasket projecting beyond rigid portions of said frame under all conditions of operation, a limp flap carried by said frame and extending beyond said gasket to establish a preliminary seal between said mat and body, and means communicating with said chamber for exhausting the same.

3. A mat adapted for handling a preformed concrete body of substantial size comprising a substantially rigid frame having a compressible cellular resilient gasket secured to one surface thereof defining an open chamber, said gasket projecting beyond rigid portions of said frame under all conditions of operation, means restraining lateral movement of said gasket with respect to said frame, a limp flap carried by said frame and extending beyond said gasket to establish a preliminary seal between said mat and body, and means communicating with said chamber for exhausting the same.

4. A mat adapted for handling a preformed concrete body of substantial size comprising a substantially rigid frame having a compressible cellular resilient gasket secured to one surface thereof defining an open chamber, said gasket projecting beyond rigid portions of said frame under all conditions of operation, a limp substantially incompressible flap carried by said frame and extending peripherally beyond said gasket to establish a preliminary seal between said mat and body, and means communicating with said chamber for exhausting the same.

5. A mat adapted for handling a preformed concrete body of substantial size comprising a frame, reinforcing means secured to one surface of said frame for rigidifying said mat, a compressible cellular resilient gasket secured to another surface of said frame defining an open chamber, said gasket projecting beyond rigid portions of said frame under all conditions of operation, a limp flap carried by said frame and extending beyond said gasket to establish a preliminary seal between said mat and body, and means communicating with said chamber for exhausting the same.

6. A mat adapted for handling a preformed concrete body of substantial size comprising a substantially rigid frame having a resilient cellular rubber gasket secured to one surface thereof defining an open chamber, said gasket projecting beyond rigid portions of said frame under all conditions of operation, a limp flap carried by said frame and extending beyond said gasket to establish a preliminary seal between said mat and body, and means communicating with said chamber for exhausting the same.

7. A mat adapted for handling a preformed concrete body of substantial size comprising a substantially rigid frame having a normally soft compressible cellular resilient gasket secured to one surface thereof defining an open chamber, said gasket projecting beyond rigid portions of said frame under all conditions of operation and having a thickness exceeding the depth of irregularities customarily encountered in concrete surfaces, a limp flap carried by said frame and extending beyond said gasket to establish a preliminary seal between said mat and body, and means communicating with said chamber for exhausting the same, said gasket acquiring increased resistance to shear under compression between said frame and body.

8. A mat adapted for handling a preformed concrete body of substantial size comprising a substantially rigid frame having a compressible cellular resilient gasket secured to one surface thereof defining an open chamber, said gasket projecting beyond rigid portions of said frame under all conditions of operation, a compressible cellular resilient supporting element carried by said frame within said gasket and in substantially coplanar relationship with respect to said gasket for engagement with said body, and means communicating with said chamber for exhausting the same.

9. A mat adapted for handling a preformed concrete body of substantial size comprising a substantially rigid frame having a compressible cellular resilient gasket secured to one surface thereof defining an open chamber, said gasket projecting beyond rigid portions of said frame under all conditions of operation, a compressible cellular resilient supporting element carried by said frame within said gasket and in substantially coplanar relationship with respect to said gasket for engagement with said body, a limp flap carried by said frame and extending beyond said gasket to establish a preliminary seal between said mat and body, and means communicating with said chamber for exhausting the same.

10. A mat adapted for handling a preformed concrete body of substantial size comprising a substantially rigid frame having a compressible cellular resilient gasket secured to one surface thereof defining an open chamber, said gasket projecting beyond rigid portions of said frame under all conditions of operation, a compressible cellular resilient supporting element carried by said frame within said gasket and in substantially coplanar relationship with respect to said gasket for engagement with said body, means restraining lateral movement of said element with respect to said frame, and means communicating with said chamber for exhausting the same.

11. A mat adapted for handling a preformed concrete body of substantial size comprising a substantially rigid frame having a compressible cellular resilient gasket secured to one surface thereof defining an open chamber, said gasket projecting beyond rigid portions of said frame under all conditions of operation, compressible cellular resilient intermediate supporting elements carried by said frame within said gasket and in substantially coplanar relationship with respect to said gasket spaced to limit external moments on said body to values less than its resisting moment, and means communicating with said chamber for exhausting the same.

12. A mat adapted for handling a preformed concrete body of substantial size comprising a substantially rigid frame having a compressible cellular rubber resilient gasket secured to one surface thereof defining an open chamber, said gasket projecting beyond rigid portions of said frame under all conditions of operation, a compressible cellular rubber resilient supporting element carried by said frame within said gasket and in substantially coplanar relationship with respect to said gasket for engagement with said body, and means communicating with said chamber for exhausting the same.

KARL P. BILLNER.

REFERENCES CITED

The following references are of record in the file of this patent:

UNITED STATES PATENTS

| Number | Name | Date |
| --- | --- | --- |
| 1,125,752 | Smith | Jan. 19, 1915 |
| 1,505,626 | Debaecker | Aug. 19, 1924 |
| 1,514,036 | Debaecker | Nov. 4, 1924 |
| 1,535,063 | Troutman et al. | Apr. 21, 1925 |
| 1,535,064 | Troutman et al. | Apr. 21, 1925 |